(12) United States Patent
Millwood

(10) Patent No.: US 11,175,961 B2
(45) Date of Patent: *Nov. 16, 2021

(54) DETECTING APPLICATION INSTANCES THAT ARE OPERATING IMPROPERLY

(71) Applicant: INTERNATIONAL BUSINESS MACHINES CORPORATION, Armonk, NY (US)

(72) Inventor: Daniel N. Millwood, Southampton (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/680,780

(22) Filed: Nov. 12, 2019

(65) Prior Publication Data

US 2020/0081739 A1   Mar. 12, 2020

Related U.S. Application Data

(63) Continuation of application No. 15/377,550, filed on Dec. 13, 2016, now Pat. No. 10,540,210.

(51) Int. Cl.
*G06F 9/46* (2006.01)
*G06F 9/50* (2006.01)
*G06F 9/48* (2006.01)

(52) U.S. Cl.
CPC ............ *G06F 9/505* (2013.01); *G06F 9/4843* (2013.01)

(58) Field of Classification Search
CPC .............................. G06F 9/505; G06F 9/4843
See application file for complete search history.

(56) References Cited

U.S. PATENT DOCUMENTS

| 7,739,687 | B2 | 6/2010 | Newport |
| 8,321,558 | B1 | 11/2012 | Sirota et al. |
| 8,667,056 | B1 | 3/2014 | Proulx et al. |
| 9,038,152 | B1 | 5/2015 | Vazquez et al. |
| 9,178,905 | B1 | 11/2015 | Adams |
| 9,690,685 | B2 | 6/2017 | Vyas et al. |
| 9,824,210 | B2 | 11/2017 | Antonelli et al. |
| 2006/0136638 | A1 | 6/2006 | Banning et al. |

(Continued)

OTHER PUBLICATIONS

Mell et al., "The NIST Definition of Cloud Computing," NIST, Recommendations of the National Institute of Standards and Technology, Sep. 2011, 7p.

(Continued)

*Primary Examiner* — Diem K Cao
(74) *Attorney, Agent, or Firm* — Cantor Colburn LLP; Teddi Maranzano

(57) ABSTRACT

A method includes determining whether an application instance has properly used computing resources to process a workload request, wherein the determination is based on one or more characteristics of the workload request to be processed. The method determines whether the application instance is operating properly, based on the determining of whether the application instance has properly used computing resources based on whether the computing resources have been accessed by the application instance a sufficient number of times; and based on the determination that the application instance is not operating properly, initiates an action to prevent the application instance from improperly processing workload.

18 Claims, 6 Drawing Sheets

(56) References Cited

U.S. PATENT DOCUMENTS

| | | |
|---|---|---|
| 2007/0016687 A1 | 1/2007 | Agarwal et al. |
| 2008/0034370 A1 | 2/2008 | Huizenga |
| 2013/0332936 A1 | 12/2013 | Magee et al. |
| 2014/0280897 A1 | 9/2014 | Curtis et al. |
| 2014/0317449 A1 | 10/2014 | Kohno et al. |
| 2015/0106502 A1 | 4/2015 | Shakhmetov et al. |
| 2015/0121400 A1 | 4/2015 | Brandwine et al. |
| 2015/0149393 A1 | 5/2015 | Hwang |
| 2016/0188733 A1 | 6/2016 | Glover et al. |
| 2017/0329690 A1 | 11/2017 | Cudak et al. |
| 2018/0077084 A1 | 3/2018 | Johnston et al. |
| 2018/0165128 A1 | 6/2018 | Cao et al. |

OTHER PUBLICATIONS

List of IBM Patents or Patent Applications Treated as Related (Appendix P); Filed Nov. 12, 2019 2019, 2 pages.

Suvash; "What is Health Management in WebSphere 8.5? Learn Health Management in IBM WebSphere Application Server"; Websphere-Infra; Dec. 1, 2014; <http://websphere-infra.blogspot.com/2014/12/what-is-health-management-in-websphere.html>; 5 pages.

DETECTING APPLICATION INSTANCES THAT ARE OPERATING IMPROPERLY

DOMESTIC PRIORITY

This application is a continuation of co-pending U.S. patent application Ser. No. 15/377,550, filed Dec. 13, 2016, the disclosure of which is incorporated by reference herein in its entirety.

BACKGROUND

An embodiment relates in general to detecting application instances that are operating improperly. More specifically, an embodiment relates to detecting application instances that do not properly use computing resources.

Within a computing environment, a server generally performs or provides a specific functionality on behalf of one or more clients that request the specific functionality to be performed. A client can correspond to a computing program or a computing device of a user. The specific functionality that is performed by a server can be functionality that is provided by a deployed/installed application. Applications can be installed upon or controlled by the server, for example.

SUMMARY

According to one or more embodiments, a computer implemented method includes assigning response codes to computing resources and determining whether an application instance has properly used computing resources to process a workload request, wherein the determination is based on one or more characteristics of the workload request to be processed. The method determines whether the application instance is operating properly, based on the determining of whether the application instance has properly used computing resources based on whether the computing resources have been accessed by the application instance a sufficient number of times; and based on the determination that the application instance is not operating properly, initiates an action to prevent the application instance from improperly processing workload.

Other embodiments of the present invention implement features of the above-described method in computer systems and computer program products.

BRIEF DESCRIPTION OF THE DRAWINGS

The subject matter of one or more embodiments is particularly pointed out and distinctly defined in the claims at the conclusion of the specification. The foregoing and other features and advantages are apparent from the following detailed description taken in conjunction with the accompanying drawings in which:

DETAILED DESCRIPTION

Figure 1:
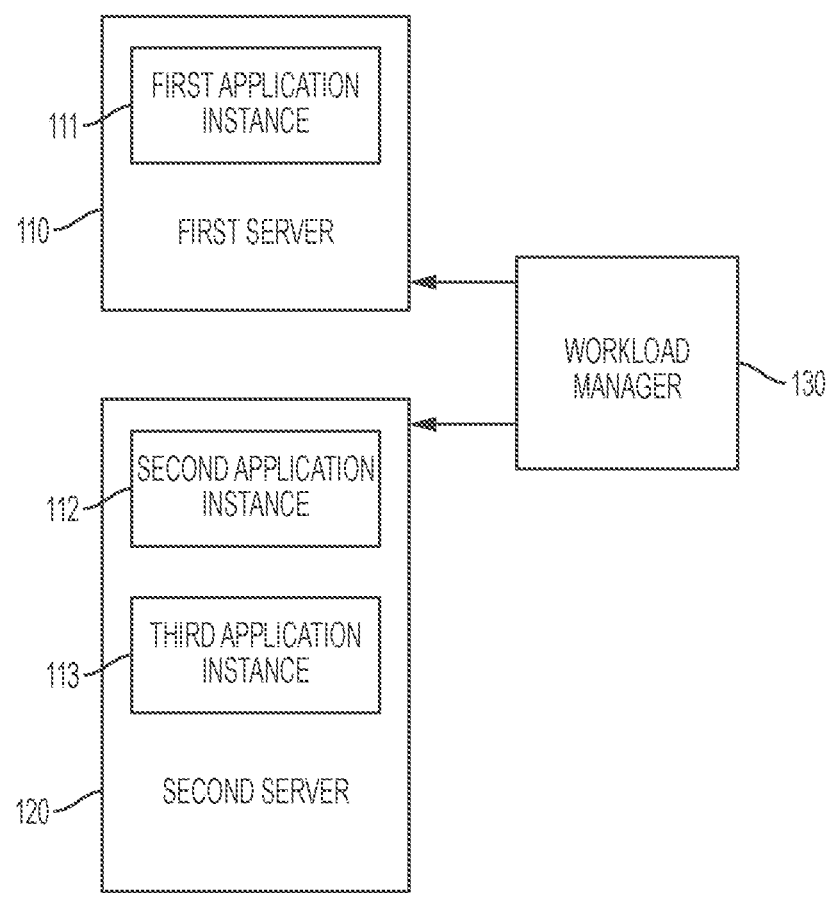
FIG. 1 depicts servers and a workload manager, in accordance with an embodiment.

One or more embodiments can include methods and computer program products for detecting application instances that are operating improperly. Various embodiments are described herein with reference to the related drawings. Alternative embodiments can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

It is also understood in advance that although this disclosure includes a detailed description on cloud computing, implementation of the teachings recited herein are not limited to a cloud computing environment. Rather, one or more embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

In a high-availability computing environment, multiple instantiations (instances) of an application may be deployed across multiple servers (or across separate functional areas of a same server), in order to ensure that the application's functionality is available to the clients. For example, an application can run on two separate servers (as two separate instances of the application). With this example, if one server fails to operate, the remaining operating server can still perform the functions of the application.

The clients can transmit their workload requests to the instances of the application via a shared source/port. The workload requests can be webservice requests, for example. The shared source/port can be a workload distribution device (such as a workload manager, for example). In one example embodiment, the instances of the application may receive incoming workload requests from a single workload manager device. In the course of processing an incoming workload request, an application instance will typically use corresponding computing resources to process the request. The computing resources that are used can depend on the characteristics of the workload request to be performed. For example, a workload request can require one or more stored records to be retrieved, modified, and/or changed. As such, in order to process the workload requests, the application can generally access a database resource, access drive/memory resources, access certain files, and/or access certain queues, in order to complete the processing, as discussed in more detail below. The number of accesses, the resources to be accessed, and/or the amount of resources to be accessed can be determined based on the workload requests that are to be processed, for example.

If a particular instance of the application operates improperly, the application instance can begin to improperly process incoming workload requests. An application instance that is operating improperly may be able to improperly process requests faster than another instance that is properly processing the requests, because processing a request improperly may take less time than the time required to properly process the same request. Therefore, as a malfunctioning application instance improperly processes workload requests faster than a properly-functioning application instance, the malfunctioning application instance will begin to accept a larger proportion of the incoming workload requests from the shared source/port, and the malfunctioning instance will continue to improperly process the incoming workload requests. As a larger proportion of incoming workload requests are improperly processed more quickly, and, as a significant proportion of the workload begins to fail, a computing problem that is referred to as a "storm drain" occurs.

One or more embodiments are directed to a method and apparatus that can determine whether or not an application instance is operating properly, based upon the resource usage of the application instance, during the course of processing workload requests by the application instance. One or more embodiments can configure/define computing policies to monitor the resource usage of an application instance, as described in more detail below. One or more embodiments can then determine whether the application instance has operated properly, based upon whether the application instance has properly used the resources. As described above, as different embodiments can use a wide variety of resources, different embodiments can define a wide variety of policies to monitor the wide variety of resources. For example, one or more embodiments can define policies to monitor whether or not the application instance has accessed a database a sufficient number of times. If an application instance is determined by a policy to use an improper amount of resources, and thus the application instance is determined to operate improperly, the policy can initiate an action as a remedy to the malfunctioning application instance. One example action is an action that disables the malfunctioning application instance. Another example action is an action that prevents the malfunctioning application instance from receiving any more incoming workload requests.

The previous approaches generally determined whether or not an application instance is operating properly based upon whether or not abnormal ends and/or other externals indicators are detected. For example, the previous approaches may determine whether a response time of an application instance is abnormal. With the previous approaches, if an application instance appears to process workload requests too quickly (i.e., resulting in a response time that is too short), the previous approaches can then conclude that the application instance is likely operating improperly. Previous approaches would then use workload routing capabilities to route incoming workloads away from the application instance that is determined to be operating improperly.

However, the previous approaches are generally unable to detect a malfunctioning application instance, if the malfunctioning application instance does not exhibit external behavior/indicators that are observable by the previous approaches as indicating an improper processing.

For example, suppose a web service request is received by a malfunctioning application instance from a shared source/port. The request may be a JavaScript Object Notation (JSON) Hypertext Transfer Protocol (HTTP) request from a shared source/port, for example. Next, suppose that a malfunctioning application instance fails to properly process the workload request because the application instance cannot access a required resource. Although the malfunctioning application instance is unable to properly process the workload request due to an inability to access the required resource, this inability to access the required resource is not an external indicator that is detected or recognized by the previous approaches as indicating an improper processing.

As such, the previous approaches are unable to detect the malfunctioning application instance.

In view of the shortcomings of the previous approaches, one or more embodiments can determine whether or not an application instance is operating properly, based upon whether or not resources are properly used by the application instance during the course of workload processing. As described above, one or more embodiments can configure/define policies that monitor the amount of resources that are used. One or more embodiments can also use policies that are already available in policy-based management systems to monitor/determine an amount of resource in use by the application instance. One or more embodiments can configure policies to determine whether or not an application instance is using sufficient resources, for example.

As an example of monitoring resource usage, one or more embodiments can configure a policy to monitor/determine whether an application instance has performed a sufficient number of database accesses and/or memory accesses. The amount and type of resource usage that should be used by the application instance will depend on the characteristics of the received workload. Suppose that an application instance receives a JSON HTTP request from a source/port, such as a request to query a customer record. In response to the request, suppose also that the application instance is configured: (1) to perform a read call to a database to retrieve the customer record, and (2) to perform an outbound webservice call to a web server. Suppose that the outbound webservice call is a webservice call that is associated with the retrieval of the customer record. For example, a banker can wish to retrieve a customer record for a customer of the bank. The banker can then wish to perform a webservice call that is associated with the retrieved customer record, such as a transmitting of a new credit-card offer to the customer of the bank.

One or more embodiments can monitor the application instance to determine whether the application instance has properly performed the necessary read request. For example, one embodiment can configure a policy that determines whether the application has performed the read request on the database to retrieve the customer record. The embodiment can also configure a policy to monitor the application instance to determine whether or not the application instance has properly performed the outbound web service call. As discussed above, monitoring of the application instance can be achieved by defining one or more policies that initiate performing of a disabling action if the application instance fails to perform the necessary successful database read requests, and/or fails to perform the outbound web service calls. With one embodiment, the policy can be enforced by the server upon which the application instance is deployed. In other embodiments, the policy can be enforced by a computer system different than the server upon which the application instance is deployed.

One or more embodiments can configure separate policies for monitoring each type of resource that is to be used. For the previous example mentioned above, an embodiment may configure a first policy to monitor the read requests, while the embodiment may configure a second policy to monitor the outbound web service call accessing. In both the case of monitoring the database read requests and the case of monitoring the outbound webservice calls, the respective policies can perform a disabling action on the application instance, if needed. The disabling action can be an action that disables the application instance that is being monitored, as discussed above.

In view of the above, one or more embodiments can determine if an application instance has accessed a needed resource a sufficient number of times, such as determining whether the application instance has performed a sufficient number of successful database requests. If the application instance has not accessed a resource a sufficient number of times, then the application instance can be determined to have not successfully processed the requests.

In the event that an application instance is disabled, other application instances can continue processing the workload requests. As such, embodiments can prevent the malfunctioning application instances from processing additional workload requests. In the meantime, the other application instances continue processing workload requests properly, and the storm drain is avoided. As embodiments can be implemented over an existing control system, one or more embodiments can use policies that have already been implemented by the existing control system.

As described above, embodiments can configure their policies to initiate a disabling action (to disable an application instance) when the policies determine that the application is using an improper amount of resources. Other embodiments can configure their policies to react differently when detecting that an application instance is using an improper amount of resources. For example, one or more embodiments can assign different response codes to different types of accessed resources, in order to distinguish some resource accesses as being more important than other resource accesses. For example, referring again to the previous example described above, where an application instance performs both a read request and an outbound service call, one embodiment can determine that the outbound service call is less important than the read request. Therefore, this embodiment can assign different response codes to reflect that the outbound service call is less important than the read request. The response codes can define a range of importance for accessing different resources by the application instance, the range being from low importance to high importance, for example. The importance of accessing a particular resource can be user defined. Therefore, in the event that an application instance fails to perform the outbound service call (which corresponds to improperly accessing a resource of low importance), one or more embodiments can configure the policy to not immediately disable the application instance. Rather, the policy can allow the application instance to continue to operate for the time being until additional conditions are met. For example, the policy can be configured to continue allowing the application instance to operate until the application instance fails to access the lower priority resource (i.e., the outbound service call) a number of times. In other words, embodiments may allow a certain number of accesses to fail before disabling the application instance.

FIG. 1 depicts servers (110, 120) and a workload manager 130, in accordance with an embodiment. As described above, one or more application instances can be deployed across one or more servers. In the example of FIG. 1, first application instance 111 is deployed on first server 110. Second application instance 112 and third application instance 113 are deployed on second server 120. As described above, the application instances can receive workload requests from clients via workload manager 130.

Figure 2:
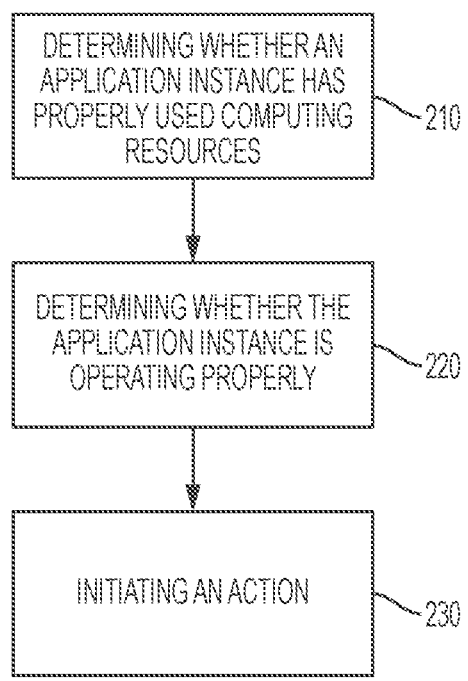
FIG. 2 depicts a flowchart of a method in accordance with one or more embodiments.

FIG. 2 depicts a flowchart of a method in accordance with one or more embodiments. The method can be performed by a server, for example. In another embodiment, the method can be performed by a computing device that operates in conjunction with a server. The method includes, at block 210, determining whether an application instance has properly used computing resources to process a workload request. The determination is based on one or more characteristics of the workload request to be processed. The method also includes, at block 220, determining whether the application instance is operating properly, based on the determining of whether the application instance has properly used computing resources. Based on the determination that the application instance is not operating properly, the method, at block 230, initiates an action to prevent the application instance from improperly processing workload requests.

Figure 3:
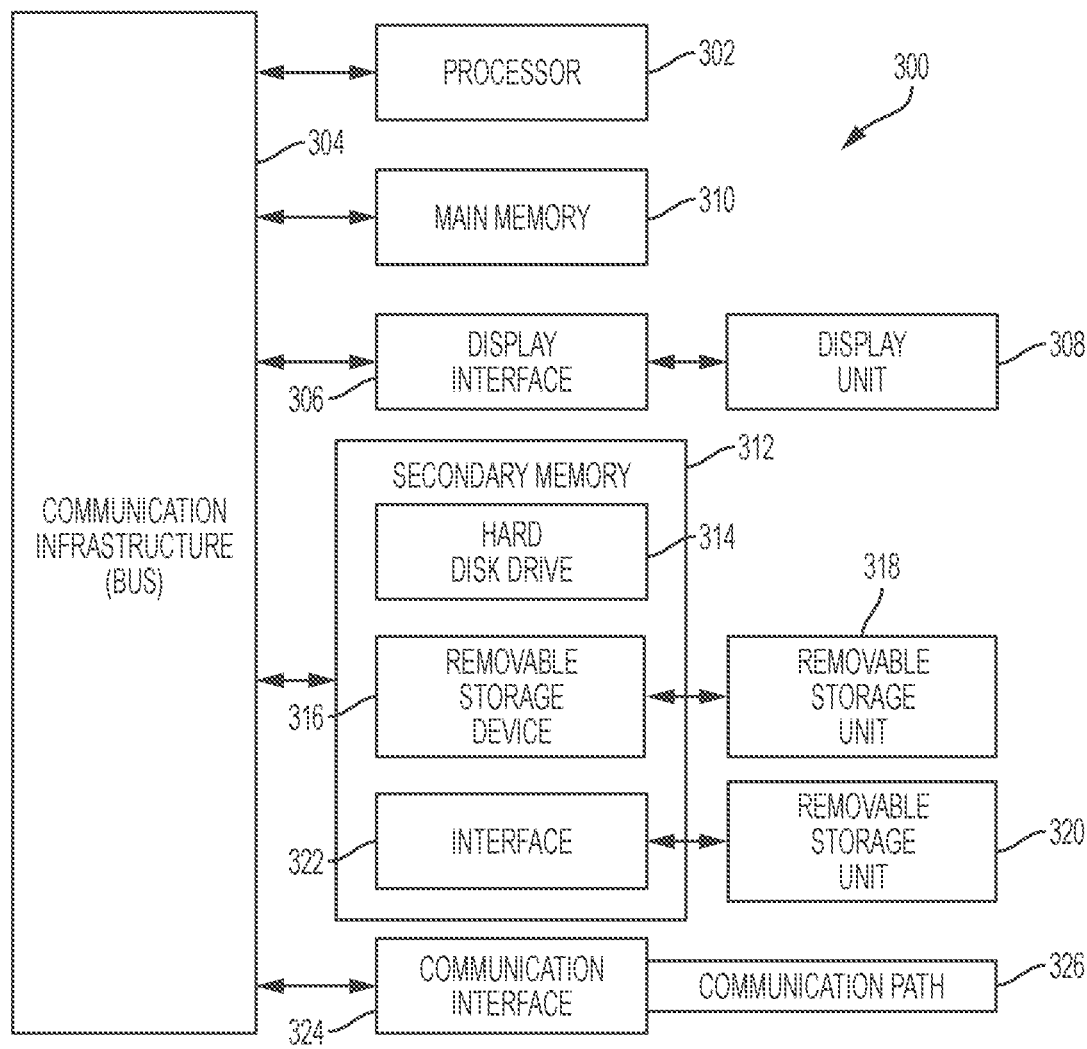
FIG. 3 depicts a high-level block diagram of a computer system, which can be used to implement one or more embodiments.

FIG. 3 depicts a high-level block diagram of a computer system 300, which can be used to implement one or more embodiments. Computer system 300 can correspond to, at least, an application server, a cloud provisioning server, a server of the end user, a workload manager, and/or a computing device of the end user. Computer system 300 can be used to implement hardware components of systems capable of performing methods described herein. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can also include a secondary memory 312. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via a communication path (i.e., channel) 326. Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314. Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the forgoing detailed description that one or more embodiments provide technical benefits and advantages.

Figure 4:
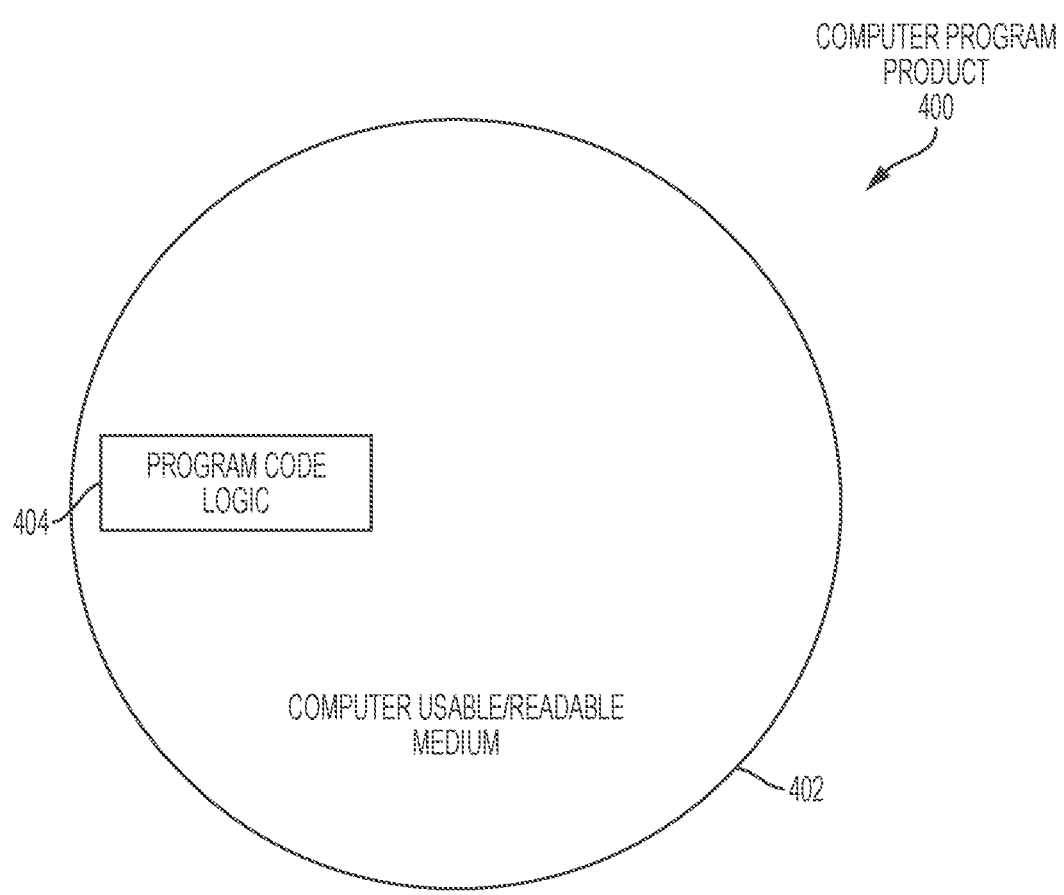
FIG. 4 depicts a computer program product, in accordance with an embodiment.

FIG. 4 depicts a computer program product 400, in accordance with an embodiment. Computer program product 400 includes a computer-readable storage medium 402 and program instructions 404.

Embodiments can be a system, a method, and/or a computer program product. The computer program product can include a computer-readable storage medium (or media) having computer-readable program instructions thereon for causing a processor to carry out aspects of one or more embodiments.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform one or more embodiments.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
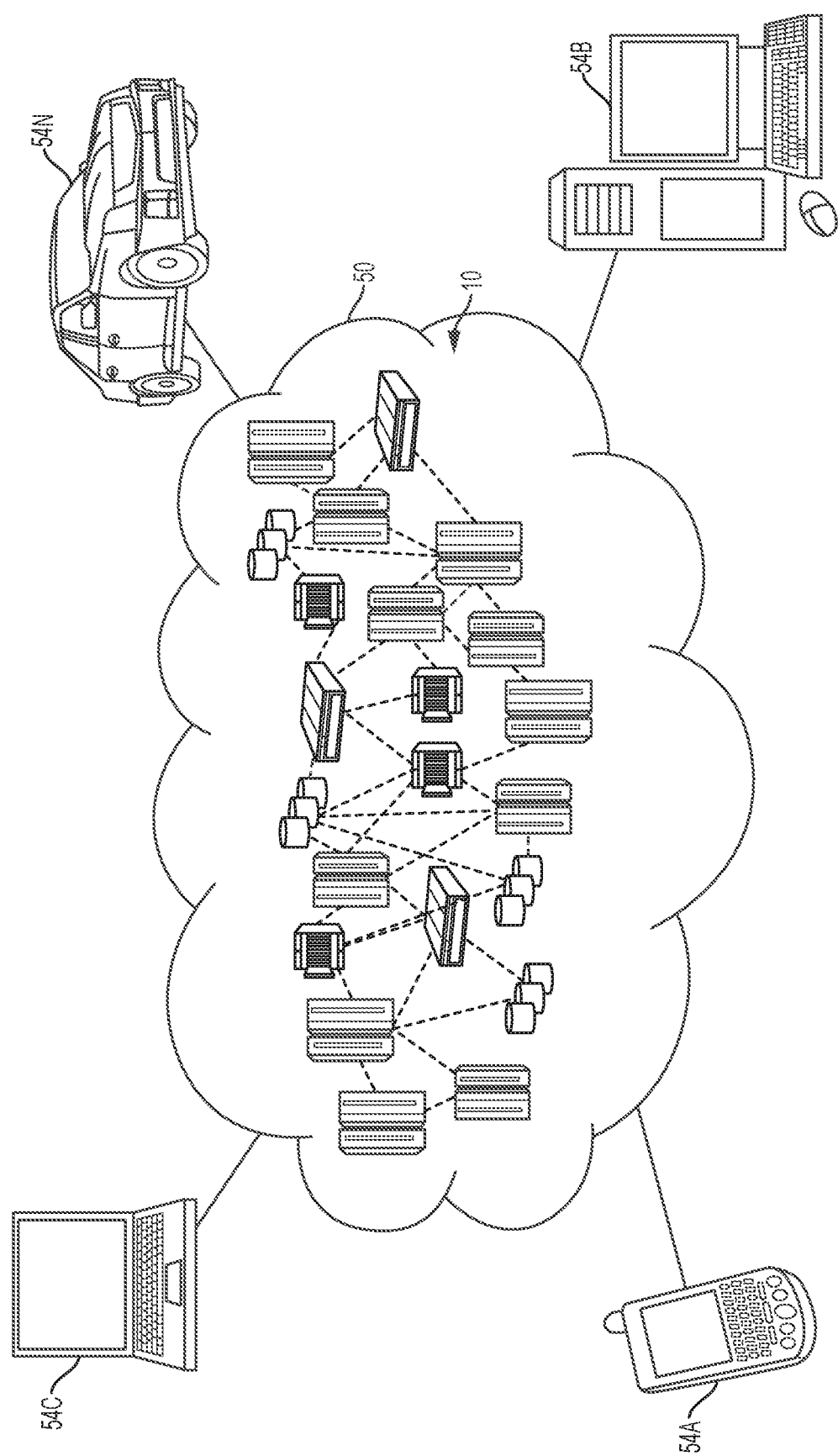
FIG. 5 depicts a cloud computing environment according to an embodiment.

FIG. 5 depicts a cloud computing environment according to an embodiment. Referring FIG. 5, illustrative cloud computing environment 50 is depicted. As described above, embodiments can be implemented within a cloud computing environment. A system that performs the method of FIG. 2 can also be implemented within a cloud computing environment, for example. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
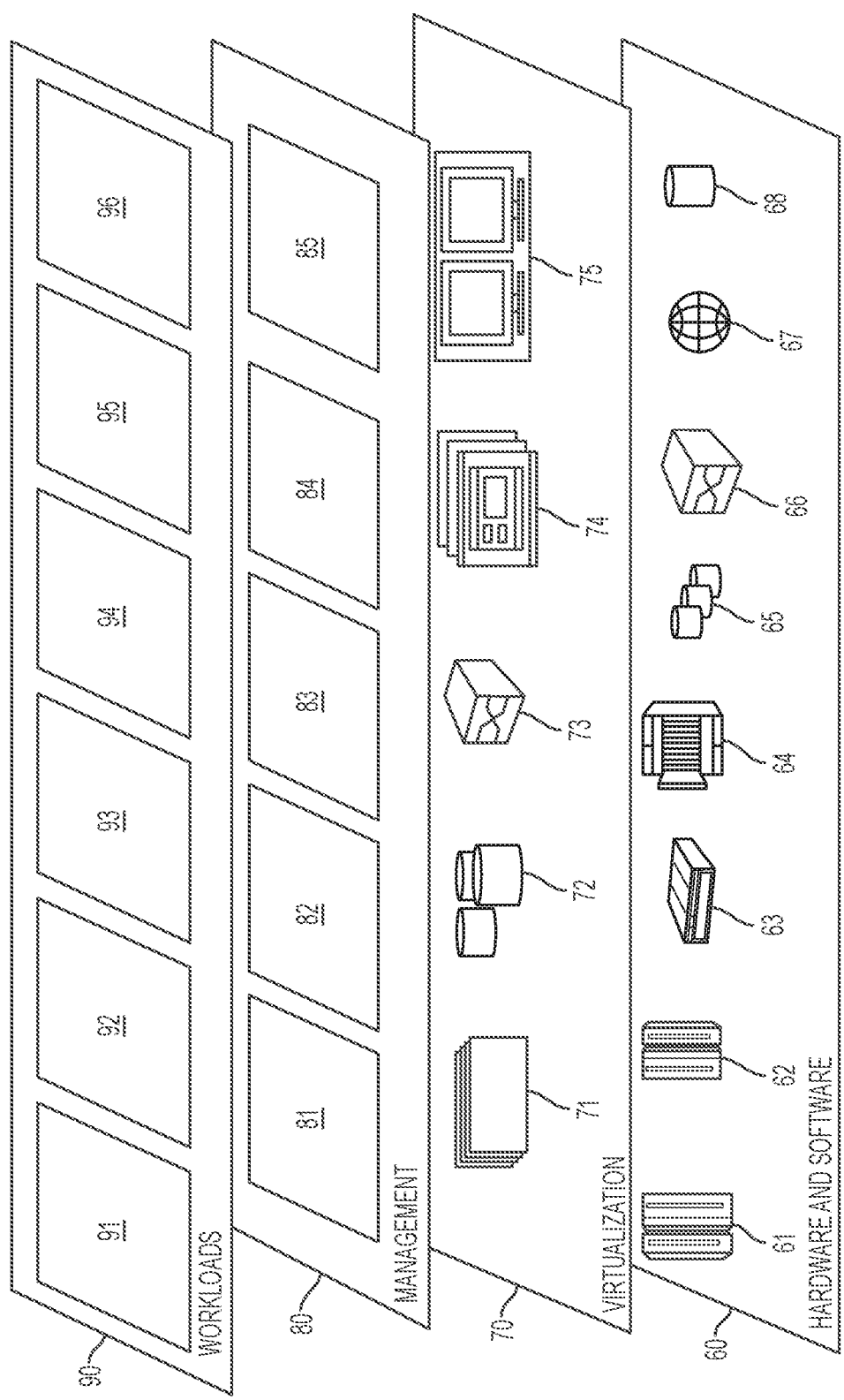
FIG. 6 depicts abstraction model layers according to an embodiment.

FIG. 6 depicts abstraction model layers according to an embodiment. Referring to FIG. 6, a set of functional abstraction layers provided by cloud computing environment 50 (FIG. 5) is shown. It should be understood in advance that the components, layers, and functions shown in FIG. 6 are intended to be illustrative only and embodiments are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and determining whether application instances are properly operating 96.

The descriptions of the various embodiments have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A computer implemented method, the method comprising:
   assigning response codes to computing resources;
   determining whether an application instance has properly used computing resources to process a workload request, wherein the determination is based on one or more characteristics of the workload request to be processed;
   determining whether the application instance is operating properly, based on the determining of whether the application instance has properly used computing resources based on whether the computing resources have been accessed by the application instance a sufficient number of times; and
   based on the determination that the application instance is not operating properly and on the response code for the computing resource that has been accessed by the application instance an insufficient number of times being a low importance response code:

checking for an other condition;

continuing operation of the application instance in response to the other condition not being met; and initiating an action to prevent the application instance from improperly processing workload in response to the other condition being met.

2. The computer implemented method of claim 1, wherein determining whether an application instance has properly used computing resources comprises configuring a computing policy to determine whether the application instance has properly used computing resources.

3. The computer implemented method of claim 1, wherein the one or more characteristics of the workload request includes one or more policies.

4. The computer implemented method of claim 1, wherein the computing resources comprise database resources and/or memory resources.

5. The computer implemented method of claim 1, wherein initiating the action comprises initiating an action that disables the application instance.

6. The computer implemented method of claim 1, wherein the application instance receives the workload request from a source that is shared by other application instances.

7. A computer system comprising:

a memory; and a processor system communicatively coupled to the memory;

the processor system configured to perform a method comprising:

assigning response codes to computing resources;

determining whether an application instance has properly used computing resources to process a workload request, wherein the determination is based on one or more characteristics of the workload request to be processed;

determining whether the application instance is operating properly, based on the determining of whether the application instance has properly used computing resources based on whether the computing resources have been accessed by the application instance a sufficient number of times; and based on the determination that the application instance is not operating properly and on the response code for the computing resource that has been accessed by the application instance an insufficient number of times being a low importance response code:

checking for an other condition;

continuing operation of the application instance in response to the other condition not being met; and initiating an action to prevent the application instance from improperly processing workload requests in response to the other condition being met.

8. The computer system of claim 7, wherein determining whether an application instance has properly used computing resources comprises configuring a computing policy to determine whether the application instance has properly used computing resources.

9. The computer system of claim 7, wherein the one or more characteristics of the workload request includes one or more policies.

10. The computer system of claim 7, wherein the computing resources comprise database resources and/or memory resources.

11. The computer system of claim 7, wherein initiating the action comprises initiating an action that disables the application instance.

12. The computer system of claim 7, wherein the application instance receives the workload request from a source that is shared by other application instances.

13. A computer program product comprising:

a computer-readable storage medium having program instructions embodied therewith, wherein the computer-readable storage medium is not a transitory signal per se, the program instructions readable by a processor system to cause the processor system to perform a method comprising:

assigning response codes to computing resources;

determining whether an application instance has properly used computing resources to process a workload request, wherein the determination is based on one or more characteristics of the workload request to be processed;

determining whether the application instance is operating properly, based on the determining of whether the application instance has properly used computing resources based on whether the computing resources have been accessed by the application instance a sufficient number of times; and based on the determination that the application instance is not operating properly and on the response code for the computing resource that has been accessed by the application instance an insufficient number of times being a low importance response code:

checking for an other condition;

continuing operation of the application instance in response to the other condition not being met; and initiating an action to prevent the application instance from improperly processing workload requests in response to the other condition being met.

14. The computer program product of claim 13, wherein determining whether an application instance has properly used computing resources comprises configuring a computing policy to determine whether the application instance has properly used computing resources.

15. The computer program product of claim 13, wherein the one or more characteristics of the workload request includes one or more policies.

16. The computer program product of claim 13, wherein the computing resources comprise database resources and/or memory resources.

17. The computer program product of claim 13, wherein initiating the action comprises initiating an action that disables the application instance.

18. The computer program product of claim 13, wherein the application instance receives the workload request from a source that is shared by other application instances.

* * * * *